United States Patent
Shoseyov et al.

(10) Patent No.: US 10,294,383 B2
(45) Date of Patent: May 21, 2019

(54) COATING LAYERS OF A NANOCOMPOSITE COMPRISING A NANO-CELLULOSE MATERIAL AND NANOPARTICLES

(71) Applicant: Yissum Research Development Company of the Hebrew University of Jerusalem Ltd., Jerusalem (IL)

(72) Inventors: Oded Shoseyov, Carmei Yosef (IL); Yossef Paltiel, Maskeret Batya (IL); Shira Yochelis, Ness Ziona (IL); Sigal Baruch-Sharon, Ness-Ziona (IL); Yuval Nevo, Rehovot (IL)

(73) Assignee: Yissum Research Development Company of the Hebrew University of Jerusalem Ltd., Jerusalem (IL)

( * ) Notice: Subject to any disclaimer, the term of this patent is extended or adjusted under 35 U.S.C. 154(b) by 0 days.

(21) Appl. No.: 15/913,396

(22) Filed: Mar. 6, 2018

(65) Prior Publication Data
US 2018/0194960 A1   Jul. 12, 2018

Related U.S. Application Data

(63) Continuation of application No. 14/378,755, filed as application No. PCT/IL2013/050205 on Mar. 6, 2013, now abandoned.
(Continued)

(51) Int. Cl.
*C09D 101/02* (2006.01)
*G02B 5/20* (2006.01)
(Continued)

(52) U.S. Cl.
CPC ........... *C09D 101/02* (2013.01); *B05D 1/007* (2013.01); *B05D 3/007* (2013.01); *B82Y 30/00* (2013.01); *C08J 5/005* (2013.01); *C08J 7/04* (2013.01); *C08K 3/08* (2013.01); *C08K 3/10* (2013.01); *C08K 3/22* (2013.01); *C08K 7/16* (2013.01); *C08L 23/06* (2013.01); *C09D 7/67* (2018.01);
(Continued)

(58) Field of Classification Search
CPC ...................................... C08B 15/08
See application file for complete search history.

(56) References Cited

U.S. PATENT DOCUMENTS 6,083,355 A * 7/2000 Spence .................. B29C 59/14
204/164
8,029,866 B2  10/2011 Lines et al.
(Continued)

FOREIGN PATENT DOCUMENTS

WO   2011/075837 A1   6/2011
WO   2012/014213 A1   2/2012

OTHER PUBLICATIONS

Podsiadlo et al. (Molecularly Engineered Nanocomposites: Layer-by-Layer Assembly of Cellulose Nanocrystals, Biomacromolecules 2005, 6, 2914-2918) (Year: 2005).*
(Continued)

*Primary Examiner* — Alexandre F Ferre
(74) *Attorney, Agent, or Firm* — Vorys, Sater, Seymour and Pease LLP

(57) ABSTRACT

The invention provides articles and methods for making such articles including a substrate coated on at least one region thereof with a layer of nanocomposites nano-cellulose materials and nanoparticles.

8 Claims, 4 Drawing Sheets

Related U.S. Application Data

(60) Provisional application No. 61/607,185, filed on Mar. 6, 2012.

(51) Int. Cl.

| | | |
|---|---|---|
| *B05D 3/00* | (2006.01) | |
| *G02B 1/10* | (2015.01) | |
| *B05D 1/00* | (2006.01) | |
| *H01B 1/20* | (2006.01) | |
| *B82Y 30/00* | (2011.01) | |
| *C08J 5/00* | (2006.01) | |
| *C08J 7/04* | (2006.01) | |
| *C09D 11/108* | (2014.01) | |
| *C09K 11/02* | (2006.01) | |
| *C08K 3/08* | (2006.01) | |
| *C08K 3/10* | (2018.01) | |
| *C08K 3/22* | (2006.01) | |
| *C08K 7/16* | (2006.01) | |
| *C09K 11/88* | (2006.01) | |
| *C09D 7/40* | (2018.01) | |
| *C08L 23/06* | (2006.01) | |

(52) U.S. Cl.
CPC .............. *C09D 7/68* (2018.01); *C09D 11/108* (2013.01); *C09K 11/025* (2013.01); *C09K 11/883* (2013.01); *G02B 1/10* (2013.01); *G02B 5/208* (2013.01); *H01B 1/20* (2013.01); *C08J 2301/26* (2013.01); *C08J 2303/02* (2013.01); *C08J 2323/06* (2013.01); *C08J 2329/04* (2013.01); *C08J 2367/02* (2013.01); *C08J 2367/04* (2013.01); *C08J 2373/02* (2013.01); *C08J 2401/02* (2013.01); *Y10T 428/265* (2015.01); *Y10T 428/3179* (2015.04); *Y10T 428/3188* (2015.04); *Y10T 428/31703* (2015.04); *Y10T 428/31971* (2015.04); *Y10T 428/31978* (2015.04); *Y10T 428/31982* (2015.04)

(56) References Cited

U.S. PATENT DOCUMENTS

| | | | |
|---|---|---|---|
| 2003/0157346 | A1 | 8/2003 | Kawamura et al. |
| 2004/0023038 | A1 | 2/2004 | Buhay et al. |
| 2005/0265935 | A1* | 12/2005 | Hollingsworth ......... A61K 8/02 424/59 |
| 2010/0040904 | A1* | 2/2010 | Cloutier .................. B32B 27/08 428/626 |
| 2010/0227094 | A1* | 9/2010 | Levesque ................ B29C 45/14 428/36.7 |
| 2011/0190402 | A1 | 8/2011 | Linhardt et al. |

OTHER PUBLICATIONS

Yan "Functional Inorganic-Cellulose Hybrid Nanocomposites" Progress in Chemistry; vol. 23; No. 11; Nov. 2011; pp. 2183-2199.
Johansson et al., "Tailoring the mechanical properties of starch-containing layer-by-layer films," Colloids and Surfaces A: Physiochem. Eng. Aspects, 2012, vol. 394, pp. 14-22.
Eita et al., "Addition of silica nanoparticles to tailor the mechanical properties of nanofibrillated cellulose thin films," Journal of Colloid and Interface Science, 2011, vol. 363, pp. 566-572.
"Nanotech coatings & new nano-enabled functionalities—part2; Ultra-thin coatings of paper by tailor-made nanoparticles," Database Compendex XP-002710787.
Bonne et al., "Demetallation of methemoglobin in cellulose nanofibril-TiO2 nanoparticle composite membrane electrodes," Electrochemistry Communications, 2007, vol. 9, pp. 1985-1990.
Fukuzumi et al., "Transparent and High Gas Barrier Films of Cellulose Nanofibers Prepared by TEMPO-Mediated Oxidation," Biomacromolecules, 2009, vol. 10, pp. 162-165.
Liu et al., "Clay Nanopaper with Tough Cellulose Nanofiber Matrix for Fire Retardancy and Gas Barrier Functions," Biomacromolecules, 2011, vol. 12, pp. 633-641.
"Free-standing multi layer thin film of cellulose nanocrystals," Database Compendex XP-002710788.
Salmi et al., "Layer structures formed by silica nanoparticles and cellulose nanofibrils with cationic polyacrylamide (C-PAM) on cellulose surface and their influence on interactions," BioResources, 2009, vol. 4, No. 2, pp. 602-625.
Mahadeva et al., "Conductometric glucose biosensor made with cellulose and tin oxide hybrid nanocomposite," Sensors and Actuators B: Chemical, 2011, vol. 157, pp. 177-182.
Gebauer et al., "A transparent hybrid of nanocrystalline cellulose and amorphous calcium carbonate nanoparticles," Nanoscale, 2011, vol. 3, pp. 3563-3566.
Liu et al., "Cellulose Nanocrystal/Silver Nanoparticle Composites as Bifunctional Nanofillers within Waterborne Polyurethane," ACS Appl. Mater. Interfaces, 2012, vol. 4, pp. 2413-2419.
Fernandez et al, "Cellulose-silver nanoparticle hybrid materials to control spoilage-related microflora in absorbent pads located in trays of fresh-cut melon," International Journal of Food Microbiology, 2010, vol. 142, pp. 222-228.
I-Itibsch et al., "Controlling the Growth Regime of Polyelectrolyte Multilayer Films: Changing from Exponential to Linear Growth by Adjusting the Composition of Polyelectrolyte Mixtures," Langmuir, 2004, vol. 20, pp. 1980-1985.
Cady et al., "Copper-Based Nanostructured Coatings on Natural Cellulos: Nanocomposites Exhibiting Rapid and Efficient Inhibition of a Multi-Drug Resistant Wound Pathogen, *A. baumannii*, and Mammalian Cell Biocompatibility In Vitro," Advanced Functional Materials, 2011, vol. 21, pp. 2506-2514.
Pinto et al., "Electrostatic assembly and growth of gold nanoparticles in cellulosic fibres," Journal of Colloid and Interface Science, 2007, vol. 312, pp. 506-512.
Tankhiwale et al., "Graft copolymerization onto cellulose-based filter paper and its further development as silver nanoparticles loaded antibacterial food-packaging material," Colloids and Surfaces B: Biointerfaces, 2009, vol. 69, pp. 164-168.
Incani et al., "Nanocomposites of nanocrystalline cellulose for enzyme immobilization," Cellulose, 2013, vol. 20, pp. 191-200.
Johnston et al., "Nanogold and nanosilver composites with lignin-containing cellulose fibres," 2012, J Mater Sci, vol. 47, 1103-1112.
Fortunati et al., "Multifunctional bionanocomposite films of poly(lactic acid), cellulose nanocrystals and silver nanoparticles," Carbohydrate Polymers, 2012, vol. 87, pp. 1596-1605.
Ribitsch et al., "The influence of classical and enzymatic treatment on the surface charge of cellulose fibres," Colloid Polym Sci, 1996, vol. 274, pp. 388-394.
Dec. 21, 2014 Lightwave Power Inc., http://www.lightwavepowercom/.
Jan. 13, 2014 Search Report and Written Opinion issued in International Application No. PCT/IL2013/050205.

\* cited by examiner

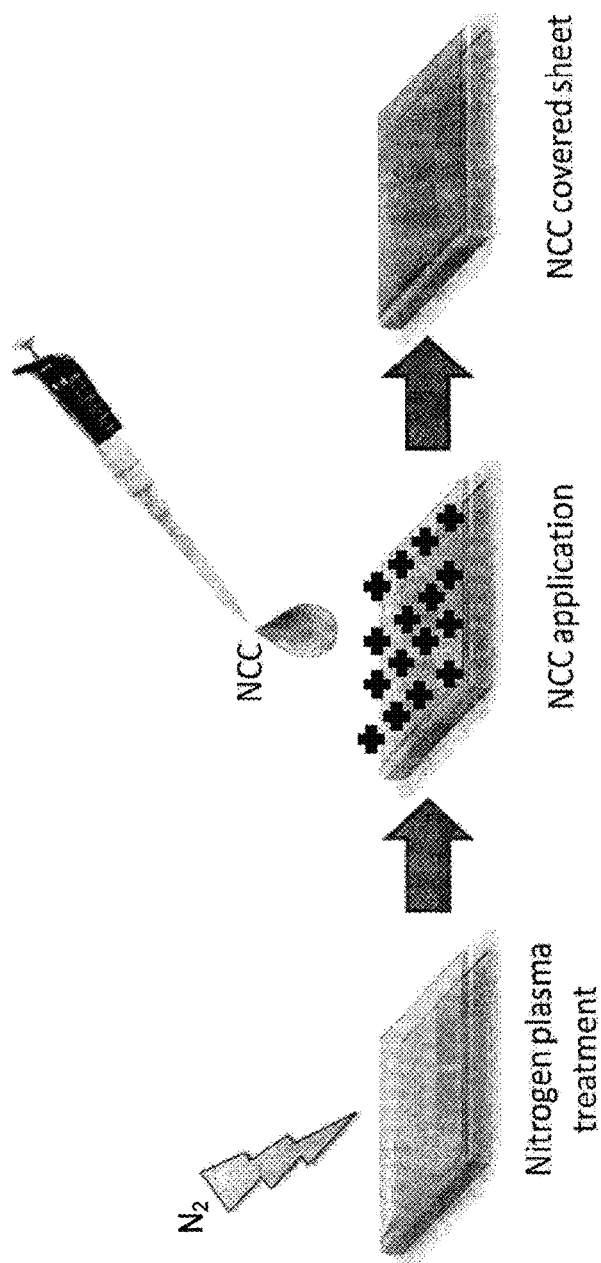

Plasma treated sheet

Untreated sheet

COATING LAYERS OF A NANOCOMPOSITE COMPRISING A NANO-CELLULOSE MATERIAL AND NANOPARTICLES

FIELD OF THE INVENTION

The present invention generally concerns multilayers of cellulose nanomaterials and uses thereof.

BACKGROUND

Nano Crystalline Cellulose (NCC) is one of the most exciting new bio-materials made from cellulose, the main component of cell walls of trees and plants, and which is present in waste streams of, e.g., paper mills and municipal sewage system sludge. In its almost-pure form, cellulose has a tiny crystalline molecular structure. NCC has intriguing properties and many potential applications. NCC may be present as liquid crystal solution in water and is known to self-assemble to macro scale ordered films having thicknesses at the nanoscale.

The nano-sized crystals possess interesting size-dependent structural and optical properties. The ability to play with the processing variables allows one to control the structure, composition, size, and level of dispersion of such nano crystals.

The routine and extensive use of plastic films composed of such materials as polyethylene (PE) and polycarbonate (PC) or poly(methyl methacrylate) (PMMA) has greatly increased, becoming a major environmental concern. The ability to reduce the amounts of such polymers in polymeric articles, while maintaining mechanical integrity, yet endow the materials or articles with optoelectronic properties has thus far been proved unsuccessful for a variety of reasons.

SUMMARY OF THE INVENTION

The inventors of the invention disclosed herein have developed a novel composite material comprising a polymeric material and an active nano-cellulose material. As the active nano-cellulose material endows the composite with sufficient mechanical properties that permit a substantive reduction in the amounts of polymeric materials used, and as the active nano-cellulose material can also modulate the optical, electronic, magnetic and mechanical properties of the composite material as a whole as compared to the same properties measured for the polymeric material alone, the composite of the invention provides a unique and superb replacement for polymeric materials known in the art.

Thus, the composite material of the invention may be formed and structured to suit a variety for applications ranging from articles for personal use through articles for use in industrial applications.

Accordingly, one aspect of the present invention provides an article having a substrate coated on at least one region of the substrate surface with at least one layer of a nanocomposite comprising at least one nano-cellulose material and a plurality of nanoparticles, the interaction between the at least one surface region and the nano-cellulose material being electrostatic.

In other words, the invention concerns a multilayer or stack structure comprising a substrate and one or more coats, layers or films of a nanocomposite. The multilayer of the invention may comprise one or more additional layers of nanoparticles and/or a nano-cellulose material, wherein said nanoparticles and/or nano-cellulose material are not in the form a nanocomposite with the polymeric material (i.e., a blend of all components together, not a mixture).

As used herein the "at least one layer of a nanocomposites" refers to a layer, coat or film of nano-cellulose material, which is in direct contact with a plurality of nanoparticles located (positioned, entrapped or embedded) at an interface or a plurality of interface regions between layers of said nano-cellulose material, and/or at the interface or interface regions between the substrate surface and a layer of a nano-cellulose material directly bound thereto. The "layer" of a nanocomposite is generally a monolayer, a bi-layer, a multi-layer, a thin film, a molecular layer or any form of assembly of the nano-cellulose/nanoparticles blend. Thus, a layer of a nanocomposite incorporates all desired material components which endow the multilayer products of the invention with the desired optical and mechanical properties. The thickness of each layer may be between 5 to 1000 nm, or from 5 and 100 nm, or from 5 and 50 nm, or from 5 and 30 nm, or from 5 and 20 nm, or from 50 to 900 nm, or from 100 to 700 nm, or from 200 to 500 nm.

It should be noted that a multilayer product of the invention may additionally comprise layers of other materials, including layers of the nano-cellulose material which are free of nanoparticles, as further disclosed hereinbelow.

Thus, the number and identity of each of the layers is variable and may depend on the desired properties as well as on the desired film thickness, which can be controlled using, e.g., different spreading methods. In some embodiments, the multilayer is composed of a plurality of nano-cellulose/nanoparticles layers, the thickness of each layer being between about 5 and 20 nm.

In some embodiments, the multilayer comprises one layer of a nanocomposite and one or more layers of a nanoparticle-free nano-cellulose material.

In other embodiments, the multilayer comprises two or more layers (2, 3, 4, 5, 6, 7, 8, 9, 10 or more) of a nanocomposite, wherein the plurality of nanoparticles are located at interface regions between layers of the nano-cellulose material.

In some embodiments, the multilayer comprises at least 10 layers, or between 10 and 500 layers, between 10 and 400 layers, between 10 and 300 layers, between 10 and 200 layers, or between 10 and 100 layers.

In further embodiments, the multilayer comprises at least 100 layers, or between 100 and 500 layers, between 100 and 400 layers, between 100 and 300 layers or between 100 and 200 layers.

In some embodiments, the multilayer comprises at least 500 layers, or between 500 and 900 layers, between 500 and 800 layers, between 500 and 700 layers or between 500 and 600 layers.

In some embodiments, the multilayer comprises a substrate and one layer of a nanocomposite comprising at least one nano-cellulose material and a plurality of nanoparticles, wherein the plurality of nanoparticles are located (positioned, entrapped or embedded) at the interface between the substrate surface and the nano-cellulose layer. Without wishing to be bound by theory, the arrangement of the nanoparticles at such interface regions is driven by the self-assembly of the nano-cellulose material into ordered layers, which traps the nanoparticles at said regions and prevents or greatly minimizes their agglomeration.

In some embodiments, the nanoparticles may be embedded in the film using chemical adsorption. With chemical interaction the nanoparticles may be adsorbed by forming covalent or hydrogen bonds with the nano-cellulose material. In such cases, the nanoparticles may be pre-coated with relevant surface ligands and linkers which assist their association with the nano-cellulose material.

In some embodiments, a further substrate material is disposed at the top surface of the two or more layers of the multilayer, thus forming a laminate or sandwich multilayer.

As a person of skill in the art would realize, the nanocomposite comprising a nano-cellulose material and a plurality of nanoparticles is characterized by a blend of the two components (i.e., cellulose and nanoparticles) which, depending on the selection of nanoparticles, may exhibit new properties which arise due to the combination of the two. The nanocomposite may comprise additional materials such as adhesives, drying agents, wettability-modulating agents, antioxidants, light stabilizers, lubricants, heavy-metal deactivating agent, anti-fogging agents, anti-static agents, flame retardants, fillers, pigments, and others.

As used herein the "nano-cellulose material" refers to any type of cellulose nanoparticles, including bacterial cellulose (BC), nanofibrilated cellulose (NFC) and nanocrystalline cellulose (NCC), also known as cellulose whiskers (CW).

Nanocrystalline cellulose (NCC) are fibers produced from cellulose; the NCC are typically high-purity single crystals. They constitute a generic class of materials having mechanical strengths equivalent to the binding forces of adjacent atoms. The resultant highly ordered structure produces not only unusually high strengths but also significant changes in electrical, optical, magnetic, ferromagnetic, dielectric, conductive, and even superconductive properties. The tensile strength properties of NCC are far above those of the current high volume content reinforcements and allow the processing of the highest attainable composite strengths.

Another type of nano-cellulose material is nano-fibers, known as micro fibrilited cellulose (MFC) or nano fibrillated cellulose (NFC) which are produced, e.g., by enzymatic treatment of mainly bleached pulp followed by shearing and homogenization of mainly bleached pulp. In some cases enzymatic pretreatments are applied in order to reduce the required production energy. Due to the relatively mild conditions employed, the amorphous cellulose remains intact, resulting in micrometer long fibers with a nanometric diameter.

Bacterial cellulose (BC) is a nanostructured extracellular product obtained from certain cellulose producing bacteria such as *Gluconobacter Xilinus*. The cellulose fibrils, being generally of higher crystallinity and purity than those obtained from plant sources (as no lignin or hemicelluloses are present), are inherently of nano-sized dimensions in their cross-section.

In some embodiments, the nano-cellulose material is characterized by having at least 50% crystallinity. In further embodiments, the nano-cellulose material is monocrystalline.

In some embodiments, the nano-cellulose material, produced as particles (e.g., fibrils, or in other cases as crystalline material) from cellulose of various origins, is selected to be at least about 100 nm in length. In other embodiments, they are at most about 1,000 μm in length. In other embodiments, the nano-cellulose material particles are between about 100 nm and 1,000 μm in length, between about 100 nm and 900 μm in length, between about 100 nm and 600 μm in length, or between about 100 nm and 500 μm in length.

In some embodiments, the nano-cellulose material particles are between about 100 nm and 1,000 nm in length, between about 100 nm and 900 nm in length, between about 100 nm and 800 nm in length, between about 100 nm and 600 nm in length, between about 100 nm and 500 nm in length, between about 100 nm and 400 nm in length, between about 100 nm and 300 nm in length, or between about 100 nm and 200 nm in length.

The thickness of the nano-cellulose material may vary between about 5 nm and 50 nm.

The fibrils of the nano-cellulose material may be selected to have an aspect ratio (length-to-diameter ratio) of 10 and more. In some embodiments, the aspect ratio is 67-100.

In some embodiments, the nano-cellulose material is NCC. In further embodiments, the NCC is selected to be between about 100 nm and 400 nm in length and between about 5 nm and 30 nm in thickness.

The NCC may be used as commercially available or may be prepared according to known methodologies such as the process described in WO 2012/014213 or its equivalent US application, herein incorporated by reference.

The "nanoparticles" which are embedded in the nano-cellulose material may be any type of nanoparticle, of a material or shape known in the art. The nanoparticles typically have at least one dimension, such as length, width, height, and diameter, below 1,000 nm. In some embodiments, the nanoparticles have at least one dimension which is less than about 100 nm. In some embodiments, the nanoparticles have at least one dimension which is between about 10 nm and 300 nm.

The nanoparticles employed in accordance with the invention may have any shape and symmetry, and may display branched or net structures. Without being limited thereto, the nanoparticles may be symmetrical or unsymmetrical, may be elongated having rod-like shape, round (spherical), elliptical, pyramidal, disk-like, branch, network or have any irregular shape. It should be emphasized that for the purposes of products and application according to the invention, the term "particle" by no means suggests any one particular pre-defined shape.

In some embodiments, the nanoparticles are substantially spherical having a diameter length as defined above.

The nanoparticles may be of a single material or a combination of at least one material(s). The material may be a metal, a metal oxide, a metal alloy, an insulator, a semi-conductor material or any combination thereof. The nanoparticles are optically active at any wavelength ranging from the near UV through the visible wavelengths and up to the near IR spectrum.

The nanoparticles may be defined by having a plurality of material regions which are defined by continuous segments of differing chemical compositions. The regions may be confined by a region of a different material, e.g., a metallic region confined by a different metal/metal alloy regions, or may be at a terminal region defining the ends of the nanoparticles.

The nanoparticle may similarly have the form of a continuous surface of a one material, having thereon spaced apart regions (islands) of at least one other, e.g., metal/metal alloy material.

For certain applications, the nanoparticles may preferably be selected amongst non-spherical nanoparticles, e.g., nanorods, having at least one elongated region and one or more end regions of the same or different material.

The nanoparticles may also be selected based on their optical or electronic properties. For example, in some embodiments, the nanoparticles may be selected to have an absorption onset in the visible, the visible and the near infrared range or even at deeper infrared then 3μ. (micron), or to have the ability to (also or only) absorb in the UV range. Without wishing to be bound by theory, different nanoparticle materials have different band gap energies and hence different optical properties and therefore may be employed in a variety of different applications. Thus, the nanoparticles may, for example, be selected to actively transform the wavelength or to change one or more optical property associated with a product of the invention. For example, the presence of silicon particles in a product of the invention allows light absorption at the UV and emission at the blue-green, to thereby increase protection from UV irradiation and to enhance efficiency.

As may be understood, the substrate material typically exhibits a first property in its initial state (i.e., in the pre-coated state) and a second and different property when coated with a film, coat or layer of the nanocomposite (i.e., in the post-coated state) according to the invention. Thus, the nanoparticles may be selected based on their optical/electronic/magnetic and/or antibacterial properties and their ability to endow a substrate material with the second property which is different from any of the known properties of the material; and/or enhance, diminish, minimize or otherwise alter an initial property of a substrate material.

The nanocomposite applied onto the substrate surface may thus provide the substrate surface with an altered electrical, optical, physical or structural state as compared to the substrate free of a coating, such changes may be in rigidity, transparency, refractive index, spectral reflectance, spectral transmittance, phase delay, polarization rotation, polarization reflectance profile, scattering profile, magnetic properties and others. The multilayer of the invention may thus be regarded as a photobleaching article.

The above properties may be modulated or achieved by employing a single type of nanoparticles or by utilizing a population of nanoparticles which is a blend of one or more different types of nanoparticles. Thus, in accordance with the present invention, it is possible to employ in a product according to the invention a blend of several types of nanoparticles, each characterized by a different material/size and optical/electronic properties.

As stated above, the nanoparticle material may be selected amongst metals, metal alloys, metal oxides, insulators, and semiconducting materials. In some embodiments, the material is or comprises an element of Group IIIB, IVB, VB, VIB, VIIB, VIIIB, IB, IIB, IIIA, IVA or VA of block d of the Periodic Table of the Elements.

In some embodiments, the material is or comprises a transition metal selected from Group IIIB, IVB, VB, VIB, VIIB, VIIIB, IB or IIB of block d the Periodic Table.

In some embodiments, the transition metal is a metal selected from Sc, Ti, V, Cr, Mn, Fe, Ni, Cu, Zn, Y, Zr, Nb, Tc, Ru, Mo, Rh, W, Au, Pt, Pd, Ag, Mn, Co, Cd, Hf, Ta, Re, Os, Ir and Hg. In some embodiments, the nanoparticle material is a transition metal oxide of any of the aforementioned transition metals, e.g., $TiO_2$.

In some embodiments, the material is a semiconductor material selected from elements of Group I-VII, Group II-VI, Group III-V, Group IV-VI, Group III-VI and Group IV semiconductors and combinations thereof.

In other embodiments, the semiconductor material is a Group I-VII material, being selected from CuCl, CuBr, CuI, AgCl, AgBr, AgI and the like.

In other embodiments, the semiconductor material is a Group II-VI material being selected from CdSe, CdS, CdTe, ZnSe, ZnS, ZnTe, HgS, HgSe, HgTe, CdZnSe, ZnO and any combination thereof.

In further embodiments, Group III-V material are selected from InAs, InP, InN, GaN, InSb, InAsP, InGaAs, GaAs, GaP, GaSb, AlP, AlN, AlAs, AlSb, CdSeTe, ZnCdSe and any combination thereof.

In additional embodiments, the semiconductor material is selected from Group IV-VI, the material being selected from PbSe, PbTe, PbS, PbSnTe, $Tl_2SnTe_5$ and any combination thereof. In other embodiments, the material is or comprises an element of Group IV. In some embodiments, the material is selected from C, Si, Ge, Sn and Pb.

In some embodiments, the material is a metal, a metal alloy, or a metal oxide. Non-limiting examples include ZnO, CdO, $Fe_2O_3$, $Fe_3O_4$, and $In_2O_3$.

In other embodiments, the material is selected amongst metal alloys and intermetallics of the above metal and/or transition metals.

In further embodiments, the material is selected from copper sulfides, selected in a non-limiting manner from $Cu_2S$, $Cu_2Se$, $CuInS_2$, $CuInSe_2$, $Cu_2(ZnSn)S_4$, $Cu_2(InGa)S_4$, $CuInS_2$, $CuGaS_2$, $CuAlS_2$ and mixed copper-iron sulfides such as $Cu_5FeS_4$ (Bornite) and $CuFeS_2$ (chalcopyrite).

In further embodiments, the material is or comprises a semiconductor material.

In some embodiments, the material is a metal/metal alloy materials of transition metals. Non-limiting examples of such are Cu, Ag, Au, Pt, Co, Pd, Ni, Ru, Rh, Mn, Cr, Fe, Ti, Zn, Ir, W, Mo, and alloys thereof.

In some embodiments, the transition metal is selected from Ag, Au and Pd.

In other embodiments, the nanoparticle material is selected from Au, Pd, $TiO_2$, $SiO_2$ and Si.

In some embodiments, the nanoparticles are quantum dots (QD).

The nanoparticles may be blended into the nano-cellulose material prior to application onto a surface of the substrate by a variety of methods so as to embed (adsorb, impregnate, hold, cage or intercalate) the nanoparticles within the nano-cellulose wet coat.

The blending of the nanoparticles into the nano-cellulose material prior to surface application may be by mixing the two or more components or by drop-wise addition of a solution/dispersion of the nanoparticles into a solution/dispersion of the nano-cellulose material.

Alternatively, the nanoparticles may be prepared in situ, in the nano-cellulose material, prior to surface application, by such methods known in the art, e.g., photo-induced metal growth, reduction of metal salts, and others.

The amount of the nanoparticles in the nano-cellulose material, e.g., NCC, is between about 0.05 and 10% (w/w).

The substrate, onto which the nanocomposite is applied, may be of any material, of any shape (film, sheet, etc) and size. The substrate may be substantially two-dimensional (of a highly thin material) or a surface of a three-dimensional article. The substrate material may be selected from paper, paperboard, plastic, metal, or composite materials. In some embodiments, the substrate materials are selected amongst biodegradable materials such as biodegradable plastics and biomass-derived materials.

As the nanocomposite applied on the surface of the substrate retains or endows the substrate with e.g., superior mechanical properties as compared to those known for the substrate material, amount, e.g., thickness, of the substrate material may be drastically reduced. Such a feature is of a paramount importance particularly where the substrate material is not biodegradable or otherwise environmentally unfriendly or expensive to produce. For example, the use of biodegradable PLA sheets requires a thickness larger than 1 mm and usually above 2 mm. This thickness makes the material non transparent. Using polyethylene sheets could be sub-millimeter in thickness, yet larger than 0.25 mm. With sheets of the invention, namely comprising PLA or polyethylene coated with one or more films of a nanocomposite, the thickness of the sheets may be reduced to the µm range, while maintaining the original rigidity.

In order to permit full and unreversible attachment of the nanocomposite coat onto the substrate, the at least region of the substrate surface must be positively charged, or electrostatically accessible (namely, capable of forming electrostatic interaction or bonding with the nano-cellulose layer) or ionizable to form positively charged surface. In other words, as the nano-cellulose material is typically negatively charged, the surface region of the substrate where coating is to be applied must be oppositely charged; thus enabling electrostatic assembly of a coat or film or layer of the nanocomposites on said at least one region surface of the substrate.

Where the substrate surface is not electrostatically accessible, the surface may be ionized by a variety of methods to endow the surface with positive charges. Such ionization may be achievable by one or more of the following:

Plasma treatment of the surface;
Chemical binding through intermediate entities.

In some embodiments, the substrate material is a biodegradable plastic material that decomposes in natural aerobic (composting) and anaerobic (landfill) environments by bacteria. Alternatively, the substrate is of a bioplastic material, derived from renewable raw materials, or petroleum-based plastics, which are free or comprise additives.

The substrate may be of any form, size and shape. In some embodiments, the substrate is a continuous material "sheet", namely in the form of a membrane having a thickness that is significantly smaller than the length and width of a few millimeters or typically 10 µm up to 500 µm. As stated above, sheets of the invention, namely comprising a polymeric material, such as PLA or polyethylene, and coated with one or more films of a nanocomposite, the thickness of the sheets may be at the µm range, while maintaining the original rigidity. Thus, the sheet thickness may be between 10 µm and 50 µm.

In some embodiments, the multilayer comprises a polymeric sheet having a thickness of between 10 µm and 50 µm and at least 200 layers of a nanocomposite as defined herein.

Non-limiting examples of substrate materials include aliphatic polyesters such as:
(1) Polyhydroxyalkanoates (PHAs) such as poly-3-hydroxybutyrate (PHB), polyhydroxyvalerate (PHV) and polyhydroxyhexanoate (PHH);
(2) Polylactic acid (PLA)
(3) Polybutylene succinate (PBS), polycaprolactone (PCL);
(4) Polyanhydrides;
(5) Polyvinyl alcohol;
(6) Starch and starch derivatives;
(7) Cellulose esters such as cellulose acetate and nitrocellulose and derivatives thereof (such as celluloid).

In some embodiments, the substrate is or coated with PLA, polyethylene, polypropylene and other polymeric materials.

In accordance with some embodiments of the invention, in order to endow mechanical strength and stiffness to a substrate material (in the form of e.g., a sheet), the one or more layers of a nanocomposite, as defined herein, may further comprise one or more layers of nano-crystalline cellulose (NCC) free of nanoparticles. Such a construction increases the strength and stiffness of the sheet, e.g., polymeric sheet, making it resistant to stress, and thus attractive as a high-performance reinforcing material.

The application of the nano-cellulose material on the substrate, e.g., polymeric sheet, need not take place on the full surface of the substrate. As stated herein, the application may be on at least one region of the substrate surface, namely on one or more surface regions of the substrate material. Thus, the term "surface region" refers to one or more such regions which may be spaced apart, patterned or pre-patterned or continuous on a surface of a substrate. In some embodiments, the layer, coat or film of the nanocomposite is continuous, discontinuous or patterned.

In some embodiments, the layer covers substantially the whole surface of the substrate. In other embodiments, a layer is formed only at one or more discrete regions of the surface. Where the control of a material property (mechanical, optical, electronic or magnetic) is required in more than one region of the substrate surface, the layer of the nanocomposite may be formed simultaneously, or sequentially (stepwise, multistep) on discrete spaced-apart regions of the surface. Some of the surface regions may be layered with a film of a material different from the nanocomposite blend as defined, e.g., with a layer of only NCC or only nanoparticles, or only another polymeric material.

As the assembly or layering of the nanocomposite on the substrate surface is in fact electrostatic, to permit efficient layering of the nanocomposite on the substrate surface, the surface must be positively charged. In cases where the substrate surface is not positively charged, the patterning process may require a first ionization step. Thus, the process for forming a patterned layer of a nanocomposite on at least a neutral surface region of a substrate (namely a surface region which is not positively charged) comprises:

1. Ionizing at least a surface region of said substrate (said region may be the whole region of the surface, or a patterned region, as defined herein) to endow said region positively charged; and
2. Applying a coat, film or layer of a nanocomposite, as defined, on said surface region.

Subsequent to such application, the nanocomposite coat is allowed to dry to afford a solid patterned film on the substrate surface.

The formation of the coat, film or layer of said nanocomposite on the surface (e.g., having been endowed with positive charges) may be achieved by any method known in the art. In a typical preparation protocol, the nanocomposite is provided in solution, emulsion, ink, or a mixture comprising thereof. Subsequently, the layer is formed by a physical or chemical method such as deposition (e g, immersing the material in a solution comprising said molecular entities), printing, jet printing, differential roll printing, contact printing, coating, spin coating, or any combination thereof or any other technique enabling such a contact.

The coat may be instantly formed (e.g., solidified) or may require further treatment steps such as heating, irradiation, drying, vacuuming or any combination thereof.

Prior to application of a coat onto the surface region or patterned region of the substrate, and depending on the nature of the substrate material, the surface region may be subjected to pre-treatment, which may include etching, heating, putting under vacuum, irradiating, removing contaminations, removing native oxide layer, forming hydrogen-terminated surface (surface hydrogenation), exposure to hydrogen gas, sonication, UV/Ozon treatment, plasma treatment, $O_2$ plasma treatment, Piranha treatment, cleaning treatment, solution treatment, or any combination thereof.

Thus, in fact, the process permits sequential or simultaneous patterning of a substrate, at two or more of the substrate surface regions being on the same face of the substrate or at different (e.g., opposing) faces, with a plurality of nanocomposites, each varying in concentration, in the type of nano-cellulose material selected, in the type of nanoparticles selected, in the presence or absence of one or more additional layers of other materials, as defined, in the thickness of the pattern, in the form and shape of the multilayered formed at a specific region, in the number of layers, etc. For example, this process permits the production of a patterned material having a plurality of patterned regions, each patterned with nanoparticles of a different or same type, such that one region of the surface may be optically transparent to UV radiation and another region may transparent to only IR. In another example, a region of the surface may remain untreated, and another region may be reinforced with a coat of only NCC.

In some embodiments, the patterning may be on both faces of the same polymeric sheet, optionally at coaxial regions.

Apart from the patterning provided by the above methodology, subsequent to the formation of the patterned multilayer, ink printing thereon may follow to produce a black and white or colored mark, label, symbol, consumer information, instructions, warnings product information, etc. The printing may be by any method known in the art.

In some embodiments, the nanocomposite may be applied to form a film coating on the substrate surface covering only a part of the surface in one or more directions to affect stiffness and elasticity to the substrate, e.g., plastic sheet, in different directions. The film may be formed on one or both sides (faces) of the substrate, e.g., plastic sheet, or maybe embedded between two such substrates, e.g., plastic sheets to form a sandwich composite. The assembly of such sandwich composite is achievable by forming a pattern of a nanocomposite on one sheet, and subsequently folding the sheet ends to cover the pattern, or by placing another sheet on top of the pattern. The two sheets enclosing the pattern may thereafter be fused by thermal fusion or by any other known methods.

A sandwich composite prepared as above, namely having a multilayer structure, wherein two substrate sheets enclose a multilayer (one or more layers) of a nanocomposite as defined, may be utilized as transparent gas barrier materials in a variety of applications, such as packaging of food products.

Thus, in another of its aspects, the invention provides a gas barrier layer comprised of a nanocomposite of nano-cellulose material and a plurality of nanoparticles, wherein said nanocomposite is provided (laminated) between two layers or sheets of a substrate material. The gas barrier layer of the invention has barrier properties of moisture vapor and a variety of gases, suppressing or blocking permeation through the layer of moisture and gases such as $O_2$, $CO_2$, CO, $N_2$, $NO_X$, $SO_X$, $H_2$ and others.

As the gas barrier layer of the invention suppresses or blocks gas permeation therethrough, it may be shaped and modified to suit a variety of applications. In some embodiments, the gas barrier layer comprises nanoparticles of a humidity or oxygen sensitive materials. In some embodiments, such nanoparticles are selected from Al, Ti, and metal oxides such as $Al_2O_3$, $TiO_2$, silicate minerals such as Montmorillonite.

The invention also provides a plastic sheet having thereon a coating or layer of a nanocomposite, as defined herein. In some embodiments, the plastic sheet is a PLA sheet, or a polymeric blend of PLA and one or more additional polymeric materials (or resins).

Plastic sheets of the invention may be utilized in a variety of applications, including: as containers, medical packs, construction materials, wire coating materials, agricultural materials, food packaging materials (to enhance storage time of packaged foods and other goods), buffer and insulation materials and others.

The sheets of the invention are particularly useful when utilized as agricultural or horticultural materials in the constructions of plastic greenhouses, plastic tunnels, and the like.

As known, solar radiation is of a paramount importance in plant growth. While there is a tendency to believe that blocking UV radiation has beneficial effects on reducing plant pathogens and insect pests, the presence of UV radiation, including high-energy UVB radiation, is actually beneficial to plant physiology and development. Indeed, plant shape, architecture, flower number, and thricomes are affected by UV radiation and thus modulating the exposure to UV radiation, as an example, as well as other components of solar radiation may be exploited to improve growing procedures for crops.

Thus, sheets of the invention may be tailored to improve growth, appearance, disease resistance and desirability of horticultural growths, such as crops, flowers, plants, vegetables and fruit, by e.g., modifying white light to produce specific light at desired wavelengths which known to promote plant growth and health.

In some embodiments, sheets of the invention, e.g., which are usable as plastic greenhouses and plastic tunnels (walk-in tunnels), comprise NCC and semiconductor nanoparticles that adsorb at one wavelength and emit at a longer wavelength. Also employed are oxides nanocrystals to imitate glass properties—absorbance in UV and IR; such nanoparticles may be selected from $SiO_2$, $TiO_2$, ZnO, $Al_2O_3$ and others.

Metal nanoparticles have specific tailored plasmonic adsorbing lines. Such sheets may be tailored or modified based on the season, the horticultural growth type and size, speed of growth, location, and appearance. The plasmonic effects may be enhanced by employing metallic nanoparticles such as: Ag, Au, Al, Fe, Cu, and others. Metal dopped oxide nanocrystals may be suitable for cutting the wavelengths in accordance to the nanoparticle material and its size. Such materials may be selected from ZnO—Ag (500-600 nm) and ZnO—Cu (500-600 nm).

Lastly, the hybrid sheets may increase the efficiency of a greenhouse by conversion of the solar energy from the UV to the relevant wavelength for the plants.

In some embodiments, for example, where a product of the invention is used as a sheet for covering greenhouses, the modulation of one or more optical property of a substrate, by a selection of nanoparticles, may afford the following, e.g., to enable fitting the specific irradiation pattern of a geographical zone and/or type of crop used:

1. To block UV irradiation from coming through the sheet, e.g., in order to protect a crop from UV irradiation and blind insects; non-limiting examples of nanoparticles include semiconductor nanocrystals such as CdTe, CdSe and CdS.

2. To the sheet make transparent in the visible, with maximum around the peak absorption of the light harvesting complexes (about 400- to 700 nm);

3. To block loss of infrared radiation in order to prevent greenhouse loss of heat at night and facilitate cooling in daytime;

4. To control flowering periods and conditions, to thereby achieve uniform flowering season, before or after natural season peak; thus, the nanoparticles may be selected from such which shift a short wavelength to longer wavelengths. Such exemplary nanoparticles may be core/shell semiconductor nanocrystals, such as: CdSe/ZnSe, CdSe/CdS, CdSe/ZnS and InP/ZnS.

5. To increase plants' defense system toward plant-eating insects, by adsorbing UV light and converting it to the red and blue;

6. To cause a shift in wavelength in a manner that is more commercially beneficial to horticultural growth in greenhouses or walk-in tunnels.

Thus, in accordance with a preferred embodiment of the present invention the invention concerns a plastic sheet, for use in greenhouses, walk-in tunnels and packaging, comprising a polymeric matrix comprising nano-crystalline cellulose said polymeric matrix embedded with metal and/or semiconductor nanoparticles having optical modulating properties.

Preferably the polymeric matrix is biodegradable and made preferably with PLA.

The invention additionally provides a nanocomposite comprising at least one nano-cellulose material and at least one type of nanoparticles (e.g., metallic or semiconductor nanoparticles) for application onto a surface.

In some embodiments, the nanocomposite is dispersed, suspended or solubilized in an aqueous or organic medium.

In some embodiments, the nanocomposite is in a form of an ink formulation, suitable for application onto a substrate.

The invention additionally provides a substrate coated with a film of at least one nano-cellulose material, e.g., NCC, said coated substrate exhibiting better selected mechanical properties as compared to the properties known and measured for the substrate alone.

In some embodiments, the substrate is PLA and the nano-cellulose material is NCC.

In some embodiments, the products of the invention are tailored for applications relating to the manufacture and use of medicinal products, hygiene products, food products or other products generally requiring pathogen free environments (packaging, wrapping, etc), namely for antimicrobial, antibacterial, antifungal or antiviral applications. In some embodiments, the product of the invention comprises at least one layer of NCC and a plurality of nanoparticles of a material selected from Ag, Cu, $MgF_2$, NiO, ZnO, CuO, $Al_2O_3$, $TiO_2$ and metal doped $TiO_2$, such as Cu-doped $TiO_2$. In additional embodiments, the antibacterial nanoparticles are selected amongst super-paramagnetic iron oxide nanoparticles (SPIONs) having surface coatings of a material selected, in a non-limiting fashion from gold and silver. In other embodiments, sheets of the invention may be formed with the following nanoparticles:

For forming high pass filters, cutting around UV, core semiconductor nanocrystals such as CdTe, CdSe, CdS, and others may be utilized;

For up conversion: shifting from short wavelength to longer wavelengths, core/shell semiconductor nanocrystals such as CdSe/ZnSe, CdSe/CdS, CdSe/ZnS, InP/ZnS, and others may be utilized;

For imitating glass properties, oxides nanocrystals having absorbance in UV and IR such as $SiO_2$, $TiO_2$, ZnO, $Al_2O_3$, and others may be utilized;

For achieving plasmonic effects, metallic nanoparticles such as Ag, Au, Al, Fe, Cu, and others may be utilized, each based on its characteristic absorbance (e.g., Au—550 nm, Al—700-800 nm, Ag—400 nm);

For cutting wavelengths in accordance to the material and its size, metal dopped oxide nanocrystals such as ZnO—Ag—500-600 nm, ZnO—Cu—500-600 nm, and others may be used.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 3 presents a schematic illustration of an embodiment of the invention involving NCC coating on a pre-treated PE sheet using $N_2$ plasma jet.

FIG. 6A: transmission spectra of $SiO_2$ embedded in NCC films at the range of 400-3500 nm. It is visible from the graph that there is a beginning of absorption at the UV range and a decrease in transmission almost to 20% above 2 μm. FIG. 6B: transmission spectra of the $SiO_2$—NCC film between 4-16 μm. It can be seen that the transmission decrease below 40% above 4 μm and above 6 μm the light is blocked.

DETAILED DESCRIPTION OF EMBODIMENTS

Results:
Preparation of Ordered NCC Films with or without NPs.

Figure 1:
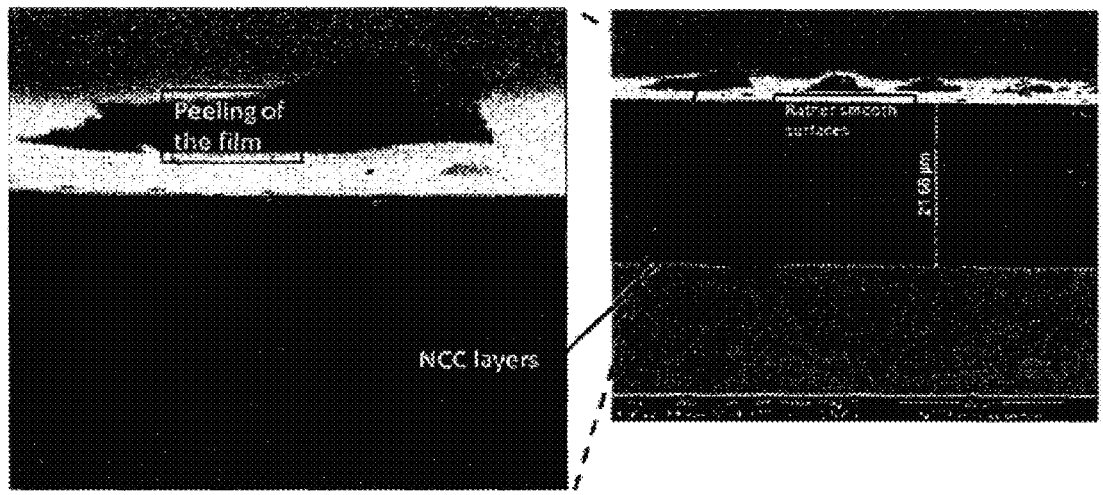
FIG. 1 shows Magellan™ XHR scanning micrographs which display cross section overview of nanoparticle-free NCC film.

NCC solutions with or without nanoparticles (NPs) were dried in an oven at 37° C. The resulting films were analyzed using Magellan™ XHR scanning microscope. The NCC film displayed formation of highly ordered NCC layers having a thickness in the range of 5-20 nm (FIG. 1).

Figure 2:
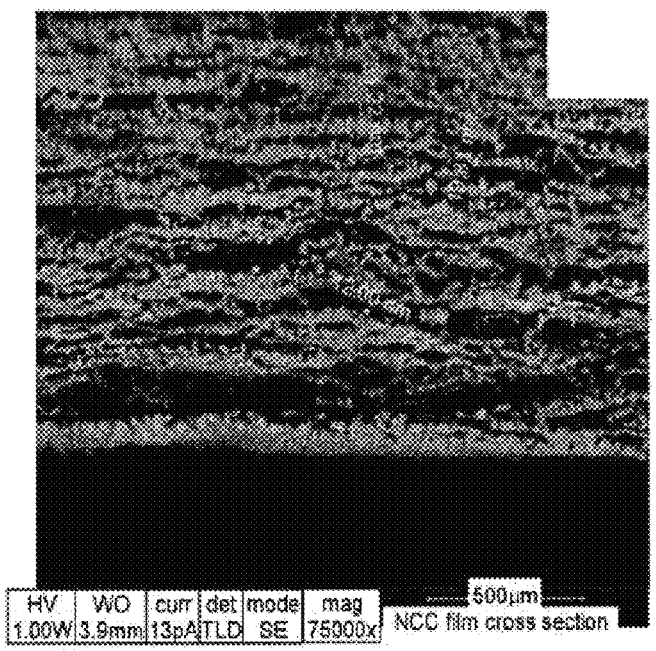
FIG. 2 shows a Magellan™ XHR Scanning micrograph which displays cross section of hybrid a NCC/NP film according to the invention.

In addition, the hybrid NCC/NP film demonstrated the same ordered layers formation, but with nanoparticles trapped between the layers (FIG. 2).

Preparation of Hybrid Nanomaterials Made of Polyethylene (PE) and NCC

Figure 4A:
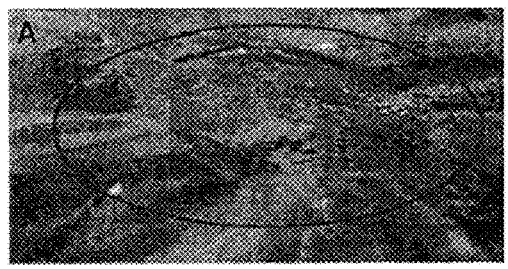
FIGS. 4A-B present hybrid PE/NCC sheets on pre-treated $N_2$ plasma jet sheet (FIG. 4A) or untreated reference sheet (FIG. 4B).
Figure 4B:
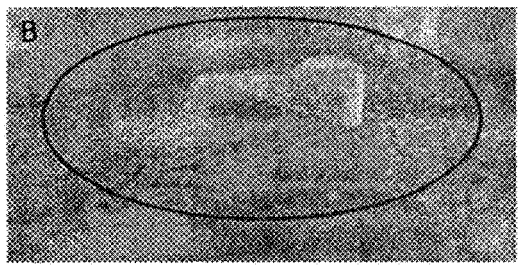

NCC coating on PE sheets was performed using $N_2$ plasma jet treatment (50% power, 150 W for 5 min, as depicted in FIG. 3). Subsequently, the NCC was spread over the pre-treated PE sheet to form a thin layer. Finally, the PE/NCC sheet was dried in an oven at 37° C. The resulting hybrid sheet displayed uniform NCC coating on the PE sheet, unlike the untreated PE sample, from which the NCC coating was observed to peel off (FIG. 4).

Preparation of Hybrid NCC/Nanocrystals (NC) Films

Figure 5:
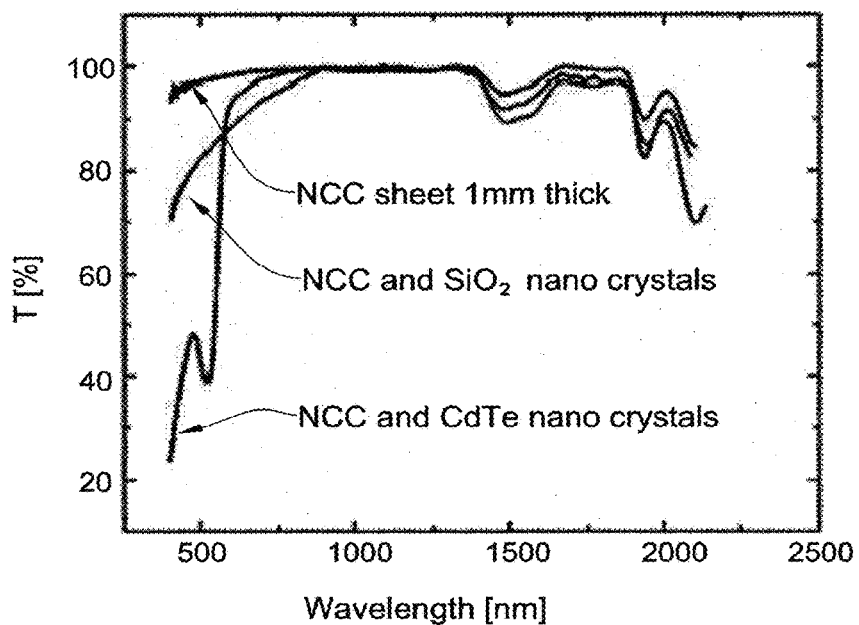
FIG. 5 shows transmission spectra of NCC films mixed with $SiO_2$ nanocrystals and with CdTe nanocrystals, compared to a bare NCC film. The film which contained the $SiO_2$ showed some reduction in the transmission at the UV region, as compared to the film containing the CdTe where the absorption at the UV region was sharp.

NCC films were mixed with different NCs to examine their optical properties. The UV blocking was illustrated with core-CdTe 5 nm crystal (FIG. 5). By mixing the NCs with the NCC, followed by drying, a sharp UV cutoff region was demonstrated. In addition, examining 5 nm crystals of $SiO_2$ mixed into the NCC films exhibited some absorption at the UV range. At the infrared region above 2 the NCC with the $SiO_2$ NCs showed absorption more pronounced than the NCC alone. FIG. 5 demonstrate that it is possible to change the spectra using sheets of NCC and NCs. Specific NC semiconductors act as an efficient low pass filters, and $SiO_2$ NCs showed an effect that resembles glass. It is important to note that using CdTe core, only adsorption effects were observed, and not wavelength conversion. With the use of core-shell nanocrystals wavelength conversion was found more efficient.

Figure 6A:
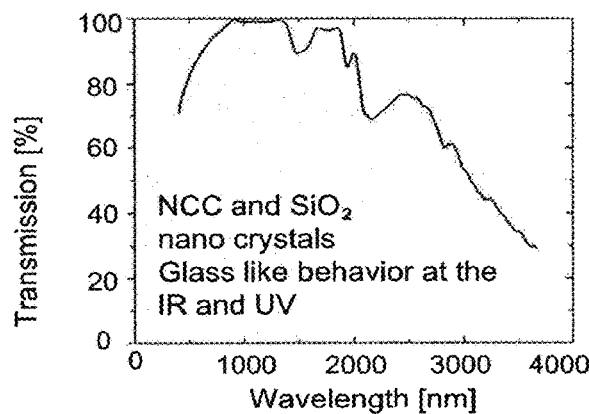
FIGS. 6A-B.
Figure 6B:
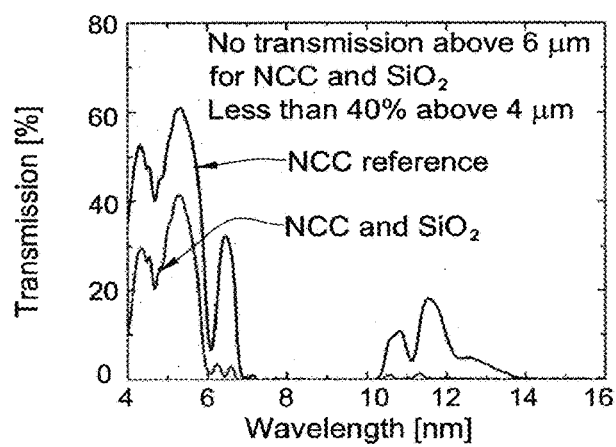

Further measurements on the NCC/$SiO_2$: films at longer wavelengths of the mid-far and long IR regions demonstrated improvement of the optical properties of the films as compared to bare NCC films or Polyethylene (FIG. 6). The transmission results displayed absorption (transmission decrease) that started above 2 (2,000 nm), reaching more that 60% above 4 μm. Even more important for the Greenhouse effect is the total blocking of the light above 6 μm.

Figure 7:
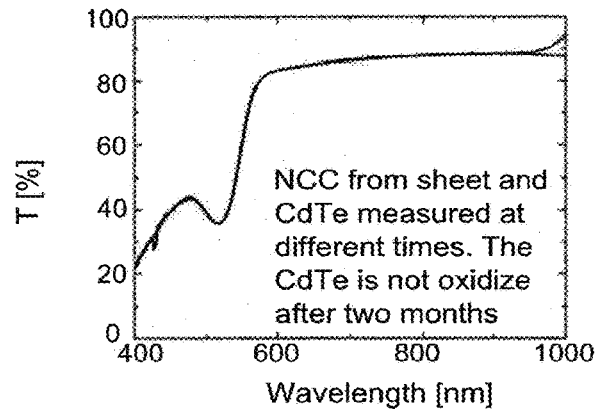
FIG. 7 presents two transmission spectra of the NCC mixed with CdTe nanocrystals. The time lapse in between the measurements is two months. Since without protection the oxidation process occurs within days, the measurements provide a proof that the NCC sheets are indeed oxide barriers.

Finally, it is demonstrated that the NCC films act as an oxygen barrier. Two subsequent measurements with a two-month gap between them are shown in FIG. 7. The spectra of the CdTe being sensitive to oxidation, does not change with time. In the case of CdTe oxidation, the spectra should be shifted to the UV region. Without the NCC, changes in the spectra are measured within days. It is thus clear that the NCC films provide good protection against the oxidation process.

The invention claimed is:

1. A multilayer sheet comprising at least one layer of a nanocomposite blend of NCC and a plurality of nanoparticles, wherein said at least one layer of the nanocomposite blend is provided optionally between two layers or sheets of a substrate material, said multilayer sheet suppressing or blocking UV or IR radiation and permeation therethrough of gases selected from $O_2$, $CO_2$, CO, $N_2$, $NO_x$, $SO_x$ and $H_2$, and wherein the nanoparticles are selected from the group consisting of ZnO, $Al_2O_3$, $SiO_2$, CdSe, $TiO_2$, doped $TiO_2$, quantum dots and combinations thereof.

2. The sheet according to claim 1, wherein said at least one layer of a nanocomposite having a thickness of between 5 to 1000 nm, or between 5 and 100 nm, or between 5 and 50 nm, or between 5 and 30 nm, or between 5 and 20 nm, or between 50 to 900 nm, or between 100 to 700 nm, or between 200 to 500 nm.

3. The sheet according to claim 1, further comprising at least one additional layer of at least one nano-cellulose material being free of nanoparticles.

4. The sheet according to claim 1, comprising two or more layers of a nanocomposite, or at least 10 layers, or between 10 and 500 layers, or between 10 and 400 layers, or between 10 and 300 layers, or between 10 and 200 layers, between 10 and 100 layers, or between 100 and 500 layers, or between 100 and 400 layers, or between 100 and 300 layers, or between 100 and 200 layers.

5. The sheet according to claim 1, wherein the nanoparticles are quantum dots (QD).

6. The sheet according to claim 1, wherein the substrate material is selected from the group consisting of paper, paperboard, plastic, metal, and composite materials.

7. The sheet according to claim 1, wherein the substrate materials being selected amongst aliphatic polymers optionally selected from the group consisting of polyhydroxyalkanoates (PHA), polylactic acid (PLA), polybutylene succinate (PBS), polycaprolactone (PCL), polyanhydrides, polyvinyl alcohol, starch and starch derivatives and cellulose esters.

8. The sheet according to claim 1, adapted for use in any one or more of the following:
   a. the manufacture of containers, medical packs, construction materials, wire-coating materials, agricultural materials, food packaging materials and buffer and insulation materials;
   b. the construction of plastic greenhouses, plastic tunnels, and other agricultural and horticultural articles; and
   c. improving growth, appearance, disease resistance and desirability of horticultural growths.

* * * * *